United States Patent [19]

Giuggio et al.

[11] 4,204,909
[45] May 27, 1980

[54] TEMPERATURE SENSITIVE SELF-ACTUATED SCRAM MECHANISM

[75] Inventors: Nicholas Giuggio, East Longmeadow, Mass.; Richard C. Noyes, New Britain; Shakir U. Zaman, Windsor, both of Conn.

[73] Assignee: Combustion Engineering, Inc., Windsor, Conn.

[21] Appl. No.: 805,251

[22] Filed: Jun. 10, 1977

[51] Int. Cl.² .................. G21C 7/06; G21C 7/08; G21C 7/10
[52] U.S. Cl. ...................... 176/22; 176/36 C; 176/86 R
[58] Field of Search ............ 176/22, 36 R, 36 C, 176/86 R, 86 L, 86 M, DIG. 5

[56] References Cited

U.S. PATENT DOCUMENTS

| | | | |
|---|---|---|---|
| 3,733,251 | 5/1973 | Gilbertson | 176/36 C |
| 3,941,413 | 3/1976 | Johnson | 176/36 C |
| 3,992,257 | 11/1976 | Erp | 176/36 C |

FOREIGN PATENT DOCUMENTS 235874  3/1960  Australia .......................... 176/DIG. 5

Primary Examiner—Samuel W. Engle
Assistant Examiner—Donald P. Walsh
Attorney, Agent, or Firm—Lombro J. Ristas

[57] ABSTRACT

A self-actuated mechanism within a safety assembly in a liquid metal nuclear reactor comprising sensor fuel pins located in a reactor coolant flow path, a sensor bulb containing NaK located near the upper end of the sensor fuel pins and in the reactor coolant flow path, and a sensor tube connecting the sensor bulb to a metal bellows and push rod. The motion of the push rod resulting from the temperature dependent change in the NaK volume actuates a safety rod release mechanism when a predetermined coolant temperature is reached.

23 Claims, 12 Drawing Figures

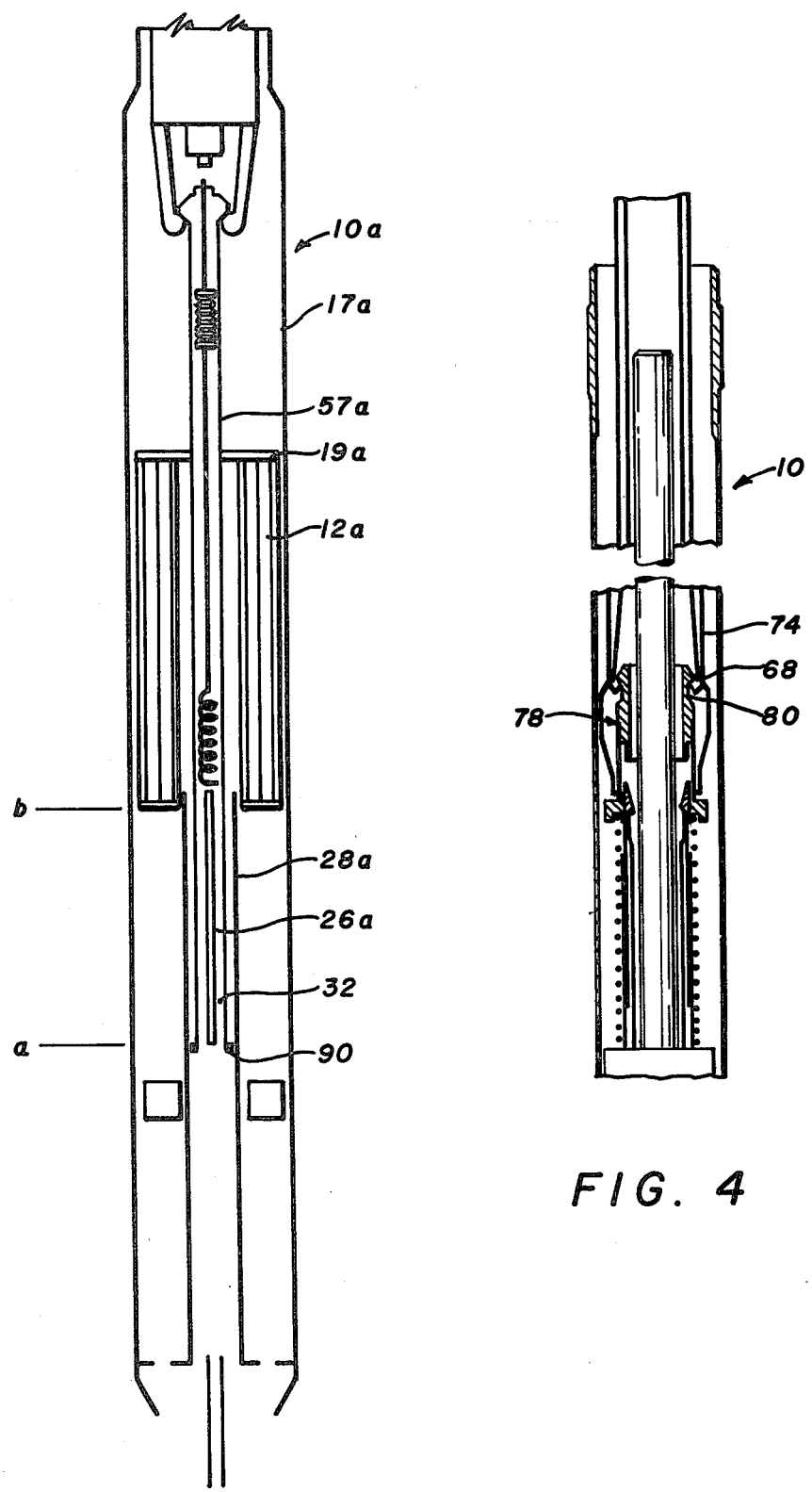

BRIEF DESCRIPTION OF THE DRAWINGS

FIG. 2 shows a cross-section view along the line 2—2 of FIG. 3a.

FIG. 4 shows the upper part of the poison bundle in the reset mode of operation after a scram.

FIG. 5 shows a schematic elevation view of the safety assembly containing an alternate embodiment of the invention.

DESCRIPTION OF THE PREFERRED EMBODIMENTS

Figure 1:
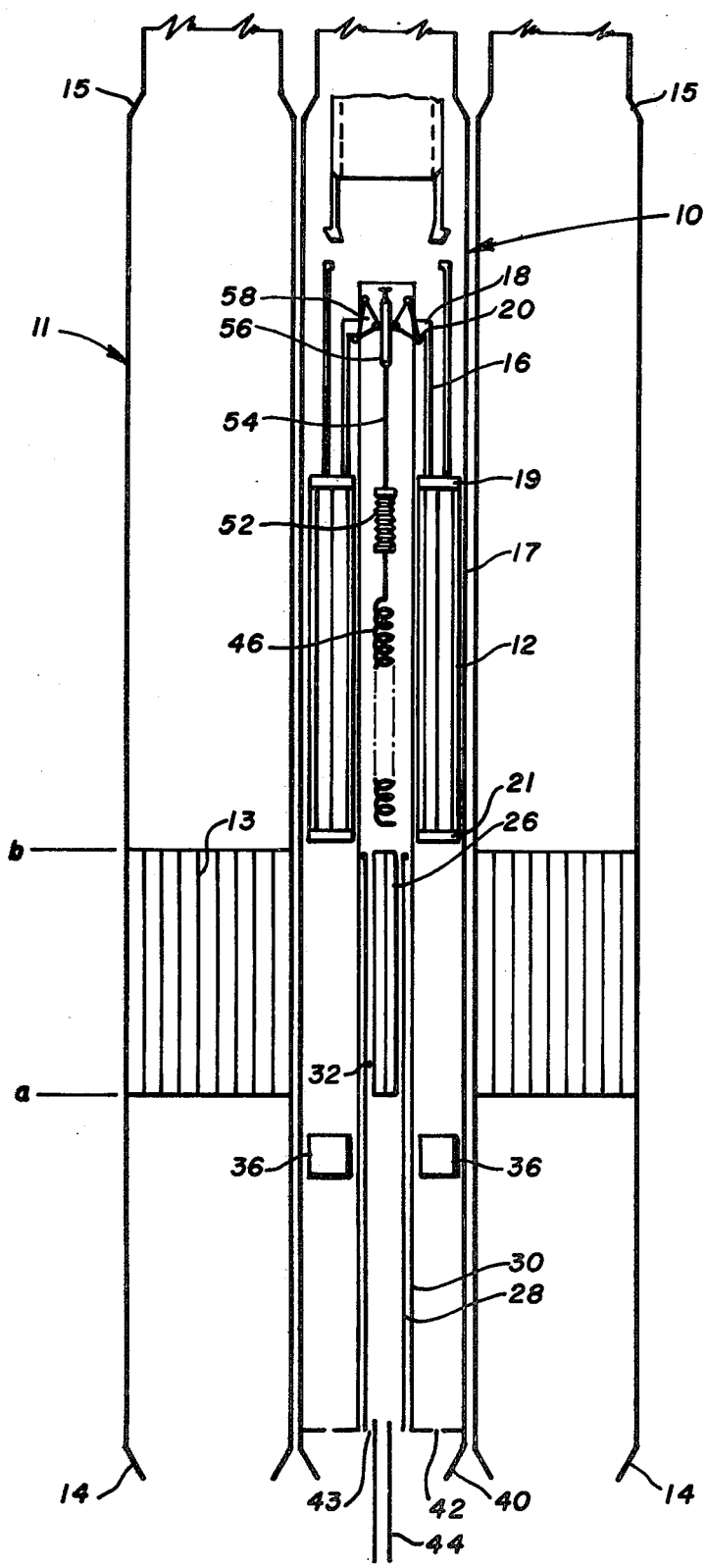
FIG. 1 shows a schematic elevation view of the safety assembly containing one embodiment of the invention.

FIG. 1 schematically shows the relation of the safety assembly 10, which contains one embodiment of the present invention, to the fuel assemblies 11 in their fixed positions within a liquid metal cooled nuclear reactor. The fuel assemblies 11 contain fuel pins 13 which have fissile material and therefore produce power only between elevations a and b. The heat generated in the fuel assembly fuel pins 13 is transferred to the reactor coolant which enters the lower end of the fuel assembly 14 located in the lower plenum (not shown), rises up through the assembly and exits from the upper end of the assembly 15 into the upper plenum region (not shown). In various locations throughout the reactor a safety assembly 10 will be completely surrounded by fuel assemblies 11. The outer portion of the safety assembly 10 consists of a safety duct 17 which, in the illustrated embodiment, is of hexagonal cross-section. The poison safety rods 12 containing B₄C absorber are shown in the withdrawn position near the upper end of the safety assembly 10. The safety rods 12 are connected to a perforated safety rod upper connector plate 19, to which are attached the poison bundle latch arms 16. The ends of the latch arms 16 are formed into a segmented poison bundle support ring 18 which is supported by three latch support rollers 20 (two shown). In the withdrawn position, the B₄C portion of the safety rods 12 extend downward in the safety assembly 10 to an elevation at or above the top of the power producing region of the fuel pins 13 in the reactor core.

Figure 2:
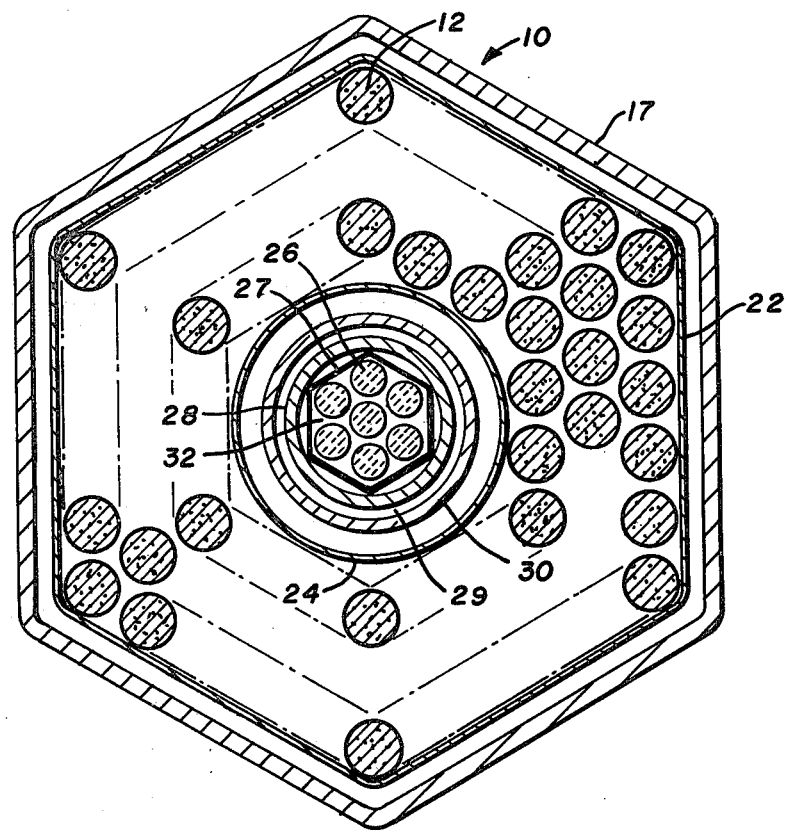

The present invention is designed to sense indirectly, yet accurately through a temperature dependence, the relationship between the power generated in the fuel assemblies and the reactor coolant flow rate therethrough, and to self-actuate a scram of the safety rods 12 when a predetermined critical relationship occurs. This is accomplished by placing within the safety assembly 10 one or more sensor fuel pins 26 (which are substantially of the same design as fuel pins 13 in the fuel assemblies 11) and directing coolant flow over the sensor fuel pins 26. The sensor fuel pins 26 and the surrounding structures within the safety assembly 10 are illustrated in detail in FIG. 2. Seven sensor fuel pins 26 are symetrically arranged within a hexagonal fuel pin duct 27, which surrounds the sensor fuel pins 26 over their entire length and forms a flow path 32 between the fuel pin duct 27 and the sensor fuel pins 26 through which reactor coolant flows upward. The flow path 32 is sized to carry coolant at a known flow rate relative to the core average flow rate so that the temperature rise of the coolant as it travels along the sensor fuel pins 26 and up through the coolant flow path 32 will correspond to the difference in core average inlet and outlet coolant temperatures. The fuel pin duct 27 is surrounded by inner column 28, insulating space 29 and outer column 30. The insulating space 29 contains either stagnant coolant or pressurized gas, for the purpose of reducing heat loss from the coolant flow path 32. The safety rods 12 are separated from the safety duct 17 by an outer shroud 22 which is also hexagonal in cross-section and are disposed in a generally annular fashion about an inner shroud 24, which is circular in cross-section. The outer shroud 22 and inner shroud 24 are attached at their tops to the upper connector plate 19 and at their bottoms to the lower connector plate 21 (see FIG. 1).

Referring again to FIG. 1, the lower end of the safety assembly 10 is formed into a support foot 40 having coolant inlet orifices 42 and 43, and test inlet nozzle 44. Reactor coolant from orifice 43 enters inner column 28, passes over the sensor fuel pins 26 whereby the coolant temperature is increased due to the heat generated in the sensor fuel pins 26. The heated coolant flows over a sensor bulb 46 raising the temperature of the sensor fluid confined therein. The expansion of the sensor fluid causes the actuator bellows 52 to expand, pushing the push rod 54 so as to move the cam 56. At a predetermined critical upper (or lower) temperature, the cam 56 will move a predetermined distance the trip the holding latch 58 to which are attached the support rollers 20. Displacement of the support rollers 20 eliminates the support for the support arms 16 and the safety rods 12 fall into the core of the reactor where the safety rods 12 will absorb neutrons and terminate the temperature transient. Sodium coolant entering the safety assembly 10 through inlet orifice 42 flows outside outer column 30 and up through the dashpot 36, over the safety rods 12, through the connector plate 19, and into the upper plenum (not shown) where it mixes with coolant from other assemblies. The primary purpose of this flow is for cooling the safety rods 12 and other structures within the safety assembly 10.

Figure 3C:
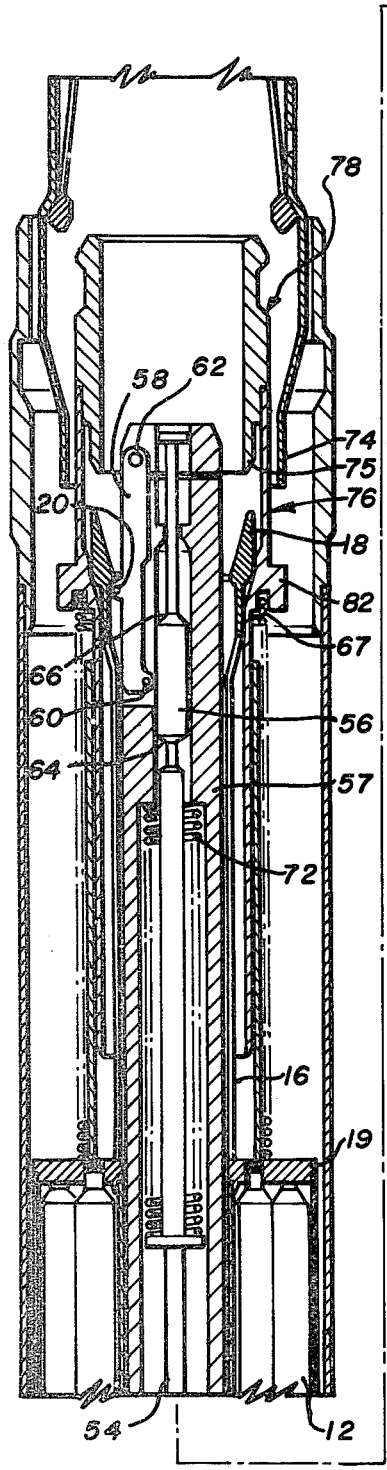
FIGS. 3a, 3b and 3c show the details of the sensing and actuating structures of the embodiment shown in FIG. 1.
Figure 3B:
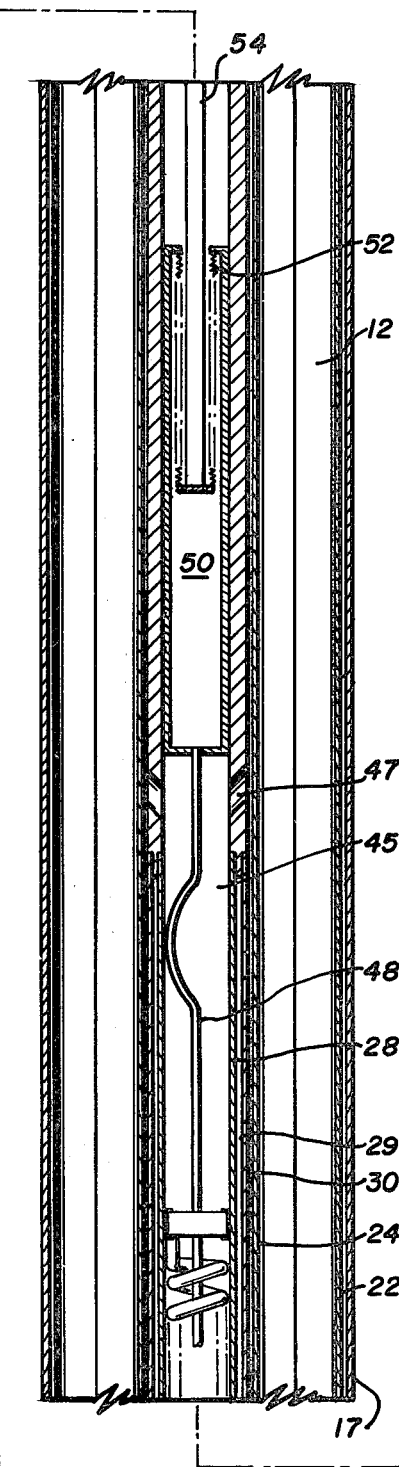
Figure 3A:
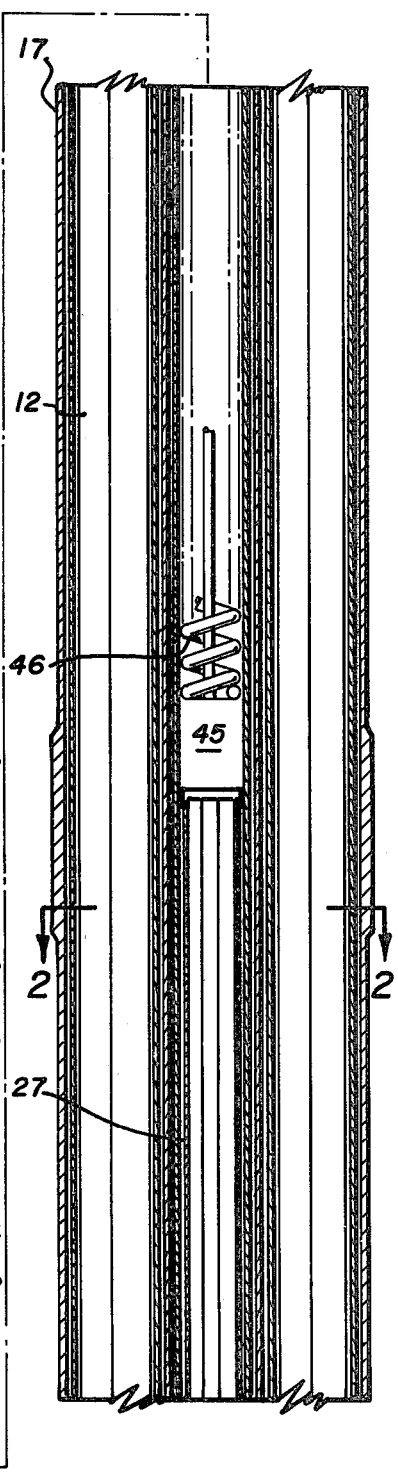

Referring now to FIGS. 3a, 3b and 3c, the sensing and actuating structures of this embodiment of the invention are shown in greater detail. In this embodiment of the invention, coolant flows into inner column 28 and upward through fuel pin duct 27, then empties into the sensor region 45. The sensor region 45 contains sensor bulb 46 which is filled with sensor fluid, such as NaK, that has a high expansion coefficient relative to the material of the bulb 46. In the preferred embodiment, the sensor bulb 46 is a helical coil, which maximizes the heat transfer area between the coolant in sensor region 45 and the sensor fluid contained within the sensor bulb 46. A sensor tube 48 connects the sensor bulb 46 to the bellows chamber 50 wherein is disposed an actuator bellows 52 that contains sodium coolant. The coolant within sensor region 45 flows through the transfer orifice 47 and outside of outer column 30.

TEMPERATURE SENSITIVE SELF-ACTUATED SCRAM MECHANISM

BACKGROUND OF THE INVENTION

This invention relates to mechanisms for rapidly dropping a neutron absorbing poison material into the core of a nuclear reactor, and in particular to mechanisms that are self-actuated when the reactor coolant temperature reaches a critical value.

Typical designs of the nuclear reactor in a liquid metal cooled system contemplate a multi-region core consisting of several different assembly types. Most assemblies contain fuel, blanket, or reflector material, which are arranged for the efficient generation of power and breeding of new fuel. Two other kinds of assemblies are distributed throughout the array of fuel and blanket assemblies: control assemblies for gradual control of the power level in the reactor, and safety assemblies for the rapid shut down (scram) of the reactor in the event of a major malfunction or other potentially dangerous condition.

Each type of assembly typically is hexagonal in shape and has a substantially integral perimeter. The fuel, blanket, and reflector assemblies typically contain their respective active materials in the form of an array of cylindrical rods that are held in fixed relationship with the assembly perimeter and with the reactor core generally. The control and safety assemblies contain neutron absorbing poison material that is movably disposed within the assembly and is typically held in a withdrawn position above the power producing portion of the reactor core until control or scram action is desired. Consequently, the control and safety assemblies extend above the core region in order to accommodate the axial motion of the poison material contained therein.

Most of the heat energy generated in the reactor core is produced in the fuel assemblies and is extracted from the core by means of a liquid metal coolant which enters at the bottom of every assembly, rises up through the assemblies, enters an upper plenum region and is directed away from the reactor core to a heat recovery system designed to produce electrical power. The most commonly used liquid metal reactor coolant material is sodium, which enters the reactor core at a temperature of about 340° C., and leaves the core at a temperature of about 510° C.

In the event of a malfunction or potentially dangerous condition, the power level is rapidly reduced by the rapid insertion of several poison safety (scram) rods, preferably by the use of a passive force such as gravity. In conventional nuclear reactor systems, instrumentation in the plant protective system (PPS) is relied upon to sense the malfunction and to produce an electrical signal to actuate a release mechanism that drops the safety rods into the reactor core. The instrumentation and release mechanism are typically external to the reactor core and the pressure vessel surrounding the core.

An additional level of safety, especially desired in the liquid metal fast breeder (LMFBR) type nuclear reactors, contemplates the use of self-actuated release mechanisms for the scram rods. These release mechanisms are directly actuated by a critical value of a system parameter such as low coolant flow rate, high power, or high core temperature, and do not rely on indirect sensors and instrumentation. It is desirable that such actuators and release mechanisms be entirely internal to the reactor vessel, thus isolating them from potentially damaging incidents such as explosions and missiles in the containment area surrounding the vessel. Self-actuated scram (SAS) mechanisms thus contain structure for sensing the system parameter, structure for actuating the safety rod release mechanism, the release mechanism, and the safety rod. The safety poison is typically in form of $B_4C$ rods, but other absorbers such as tantalum spheres have also been proposed.

The reactor coolant temperature is one system parameter used to provide protection against a wide range of severe system malfunctions. Excessive coolant temperature results from a coolant flow rate that is too low for the desired power level, or a power level that is too high for the desired flow rate. Several prior art SAS mechanisms utilize the temperature-dependent phase change of a material located in fluid communication with the reactor coolant and designed as a "weak link" in holding the safety rod out of the reactor core during normal operation. When the reactor coolant reaches the melting point of the "weak link," the chain of support elements is broken and the safety rod falls into the reactor core. Another SAS mechanism utilizes the differential axial expansion of two metallic cylinders located in fluid communication with the reactor coolant to sense the coolant temperature rise and move a push rod, actuating the release of a mechanical gripper which holds up the safety rod.

Although the temperature sensitive SAS mechanisms in the prior art will scram the reactor at an excessive temperature, each is deficient in some important ways for use in large LMFBRs. These mechanisms either react too slowly to temperature changes or have a large uncertainty in the actuation temperature relative to the average reactor coolant outlet temperature. If the PPS mode of scram fails to operate, these deficiencies in the prior art SAS mechanisms will probably result in some damage to the fuel. Most prior art SAS mechanisms do not permit sharing of the safety rod release mechanism by the PPS and SAS modes of scram. Some prior art SAS mechanisms are not resettable after a scram, thereby necessitating different safety assemblies for PPS scram and SAS purposes.

SUMMARY OF THE INVENTION

The present invention accurately infers the average reactor coolant temperature exiting from the reactor core and rapidly and reliably actuates a safety rod release mechanism on the occurrence of a critical value of the outlet temperature. The outlet temperature is inferred from the cooperative affect of the flow rate through a coolant flow path within the safety assembly and the heat generated by sensor fuel pins contained therein. The flow rate and heat generation are representative of the core average flow rate and power level. The inferred core outlet temperature is sensed by a confined fluid having a high expansion coefficient, the expansion of which is translated to a linear force used to actuate the release mechanism. The temperature sensor, the actuator, and the safety rod release mechanism are all contained within the safety assembly and do not interfere with the operation of the plant protection system scram mode. The invention performs reliably in a liquid metal environment, is easily tested, and is resettable following a scram. The time interval between overtemperature of the reactor coolant and the inser- The actuator bellows 52 is made of a metal such as Inconel 718 that is resistant to creep and swelling resulting from exposure to high radiation. The bellows 52 is connected to a push rod 54 that extends upward and has connected at its end a double step cam 56. The bellows chamber 50, the push rod 54, and the cam 56 are all enclosed within a cylindrical column which may be an extension of the outer column 30 and will be referred to as support column 57. In the vicinity of the poison bundle support ring 18 the support column 57 is slotted so that the latch support rollers 20 can extend up through the surface of the support column 57 and contact the poison bundle support ring 18. The three holding latches 58 (one shown) are pivotally attached to the support column 57 by means of pins 62 and slidably contact cam 56 at the actuating rollers 60.

During normal operation, reactor coolant enters the safety assembly through inlet orifice 43 and as described above flows over the sensor fuel pins 26 contained within the outer column 30. The sensor fuel pins 26 produce heat in proportion to the heat generated by the fuel in the fuel assemblies surrounding the safety assembly, and the flow rate through flow path 32 is proportional to the average flow rate through the fuel assemblies. Thus the coolant flow through fuel pin duct 27 and the sensor fuel pins 26 cooperate to represent the core average flow and core average heat generation, respectively. After the heated coolant leaves the fuel pin duct 27 it heats the NaK sensor fluid within the sensor bulb 46. Temperature changes in the sensor fluid contained within the sensor bulb 46, sensor tube 48, and bellows chamber 50 produce changes in pressure acting on the actuating bellows 52.

If the reactor coolant temperature rise is so large that a scram is required, the actuating bellows 52 will contract far enough to permit the actuating roller 60 to drop into the high temperature trip step 64 on the cam 56. This moves the latch support roller 20 away from the poison bundle support ring 18, thereby inserting the safety rods 12 into the reactor core. Similarly, if the coolant temperature drops below a predetermined acceptable value the actuating bellows 52 will relax and the spring 72 will pull the step cam 56 downward until the actuating roller 60 drops into the low temperature trip step 66. The return spring 72 is disposed between the support column 57 and the stem cam 56 in order to displace the step cam 56 downward without imposing a tensional load on the actuating bellows 52. In the illustrated embodiment, the SAS trip will occur when the average core coolant outlet temperature is 37°±4° C. greater than the acceptable maximum operating temperature or 37°±4° C. lower than the minimum acceptable operating temperature. Approximately 0.5 seconds will pass before the NaK specific volume in the sensor bulb 46 changes sufficiently to actuate the release mechanism (the latch 58 and poison bundle support ring 18). The bellows 52 expands or contracts at a rate of 0.65 cm per 56° C. bulb temperature change.

Referring more specifically to FIG. 3c, in this embodiment of the invention the poison bundle support ring 18 is also used to release the safety rod 12 in the PPS mode of scram whereby the guide tube 74 located within the upper portion of the safety assembly 10 pushes down on the PPS actuator shoulder 82 until the segmented poison bundle support ring 18 automatically spreads open. In case of malfunction the PPS spreader 75, being an integral part of the PPS actuator 76 forces the poison support segments 18 open to release the poison bundle. The spreader 75 constitutes a failsafe feature within the PPS actuator 76. The PPS actuator shoulder 82 serves to keep the poison bundle support ring 18 in position during normal operation, and a scram assist spring 67 is normally in compression between the shoulder 82 and the connector plate 19. Whether the safety rods 12 are scrammed in the SAS mode or the PPS mode, the safety rods 12, safety rod upper connector plate 19, poison bundle latch arms 16, poison bundle support ring 18, scram assist spring 67, actuator shoulder 82, and reset head 78 (collectively referred to as the poison bundle) all slidably drop towards the core region while the outer column 30, support column 57 and the structures contained therein remain fixed.

FIG. 4 shows how the safety rods 12 are reset after a SAS mode scram. The guide tube 74 and the retrieval gripper 68 are lowered down into the safety assembly 10 until the retrieval gripper 68 engages the reset notches 80 in the reset head 78. The poison bundle is raised to the initial withdrawn position until the reactor coolant temperature reaches the operating value and thereby raises the cam 56 so that the latch support roller 20 will engage the poison bundle support ring 18. The gripper 68 is then completely disengaged for normal plant operation.

The SAS mechanism can be tested by injecting high temperature sodium into the test nozzle 44 which feeds into inner column 28 (see FIG. 1). The flow rises up through flow path 32 as described above, except that under typical test conditions little heat will be generated by the sensor fuel pins 26. Consequently, the temperature of the test coolant entering at test nozzle 44 will be at the expected scram temperature. If the high temperature test results in a scram, but at a temperature greater than the desired scram temperature, this is an indication that some leakage of sensor fluid in the sensor bulb 46, sensor tube 48, or bellows chamber 50, may have occurred.

In an alternate embodiment of the invention shown schematically in FIG. 5, the sensor fuel, bulb, and bellows arrangement is connected to the safety rods and drops with them in either the SAS or PPS mode of scram. This embodiment is illustrated in FIG. 8 in conjunction with a release mechanism that is pneumatically actuated.

Referring now to FIG. 5 where elements corresponding to equivalent elements in the above embodiment are designated by similar numerals having a suffix, "a", there is shown a safety assembly 10a having a safety duct 17a containing safety rods 12a connected at their tops by upper connector plate 19a which is attached to the central support column 57a. The support column 57a and structures therein to be described below will remain in fixed relationship with the safety rods 12a (collectively referred to as the poison bundle) as the safety rods 12a drop during a scram.

When the safety rods 12a are fully withdrawn, the support column 57a extends downward to an elevation slightly below the bottom of the active core (elevation a). The lower portion of the support column 57a is disposed within the upper end of fixed column 28a and separated therefrom by a slide seal 90 attached inside fixed column 28a near the bottom of support column 57a for the purpose of accommodating movement of the support column 57a relative to the fixed column 28a while forcing substantially all of the coolant flowing up through fixed column 28a into support column 57a when the support column 57a is in the withdrawn position. The sensor fuel pins 26a are within the lower end of the support column 57a and extend upward inside support column 57a to an elevation above the top of the core (b) where the sensor fuel pins 26a are attached at their tops to the support column 57a. The sensor fuel pins 26a are spaced apart from each other within the support column 57a by any convenient spacer grid means which can also serve as the attaching means between the sensor fuel pins 26a and the support column 57a.

Figure 6:
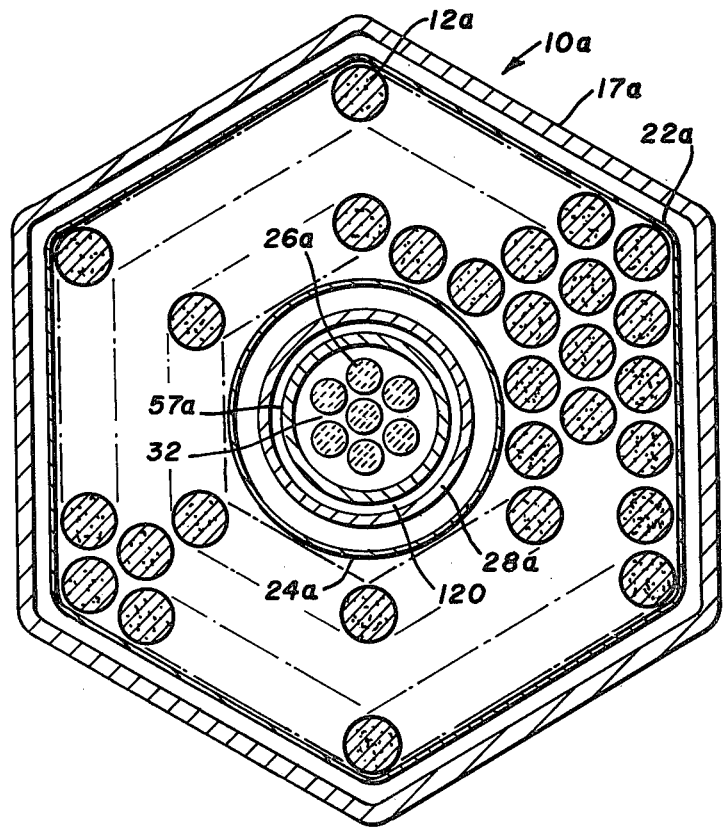
FIG. 6 shows a cross-section view along the line 6—6 of FIG. 7b.

Referring now to FIG. 6, the relation of the sensor fuel pins 26a to the other structures in the safety assembly 10a is shown in cross-section. The safety rods 12a are disposed between outer shroud 22a and inner shroud 24a, and remain in fixed relation with the sensor fuel pins 26a and the support column 57a. As is best illustrated in FIG. 5, the top of fixed column 28a is disposed between the safety rods 12a and the support column 57a so as to act as a guide for the inner shroud 24a and support column 57a to slidably drop during a scram.

Figure 7B:
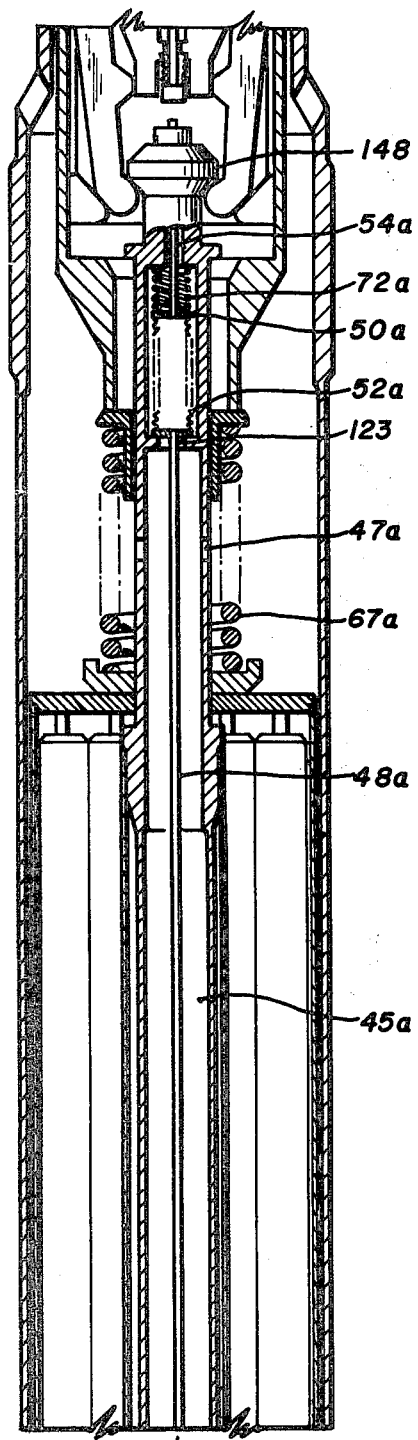
FIGS. 7a and 7b show the details of the sensing and actuating structures of the embodiment shown in FIG. 5.
Figure 7A:
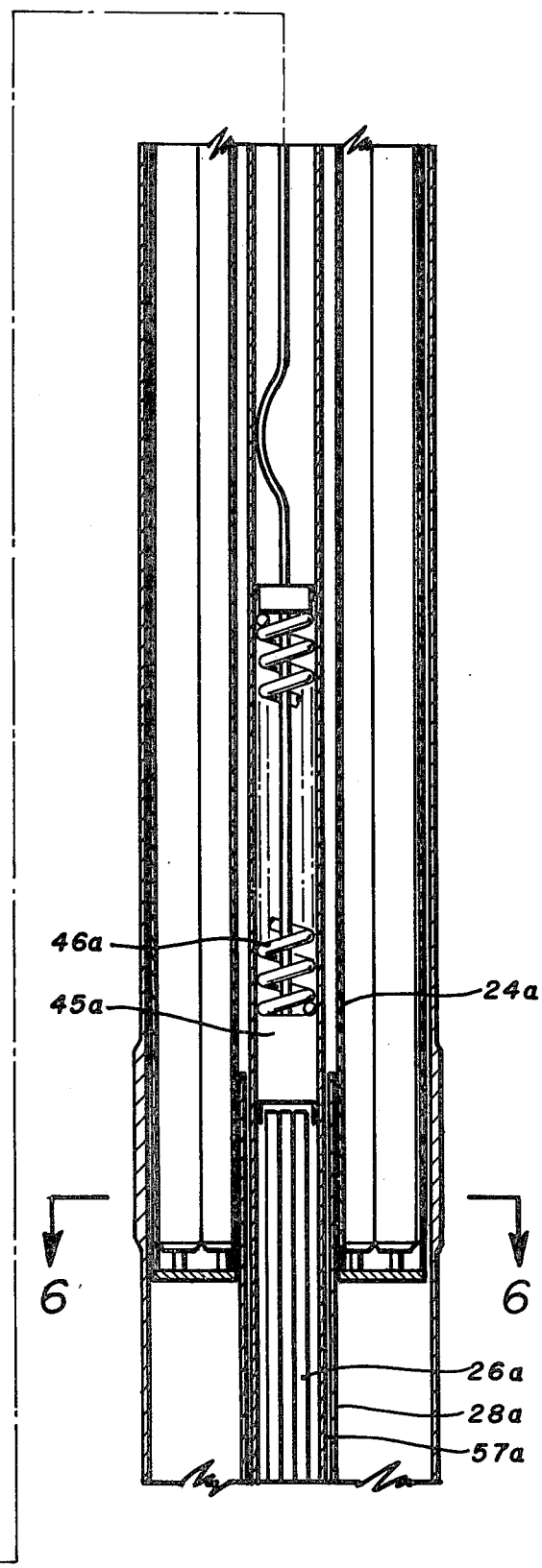

Referring now to FIGS. 5, 7a and 7b, sodium coolant flows up fixed column 28a and into the lower portion of support column 57a wherein are disposed the seven sensor fuel pins 26a. This coolant is heated as it flows up through the flow path 32a between the sensor fuel pins 26a and the inside of the support column 57a until it enters the sensor region 45a wherein is disposed a sensor bulb 46a. A sensor tube 48a is in fluid communication with the sensor bulb 46a and with the inside of bellows 52a such that when the sodium coolant heats the NaK sensor fluid contained within the sensor bulb 46a, the NaK expansion is communicated to the bellows 52a. The sodium coolant exits the sensor region 45a into the sodium flow outside the support column 57a through transfer orifices 47a, and is prevented from communicating with the bellows 52a by a seal 123 between sensor region 45a and bellows chamber 50a. The bellows chamber 50a also contains a bellows return spring 72a.

The support column 57a has a knob 148 formed at its top end in which is slidably disposed a push rod 54a one end of which is connected to the bellows 52a and the other end of which projects slightly above the knob 148. Sodium coolant is free to leak into the bellows chamber 50a through the opening in which the push rod 54a is disposed, but the bellows 52a is sealed at both ends so that only NaK sensor fluid is contained therein. The amount of expansion of the bellows 52a and hence the distance traveled by the push rod 54a depends on the temperature of the coolant in the sensor region 45a. In this embodiment, the linear motion of the push rod 54a greater than a predetermined distance corresponding to the maximum acceptable reactor coolant outlet temperature, actuates a pneumatically controlled release mechanism of a type fully described in U.S. Pat. No. 3,733,251 issued to J. C. Gilbertson et al, which is hereby incorporated by reference.

Figure 8A:
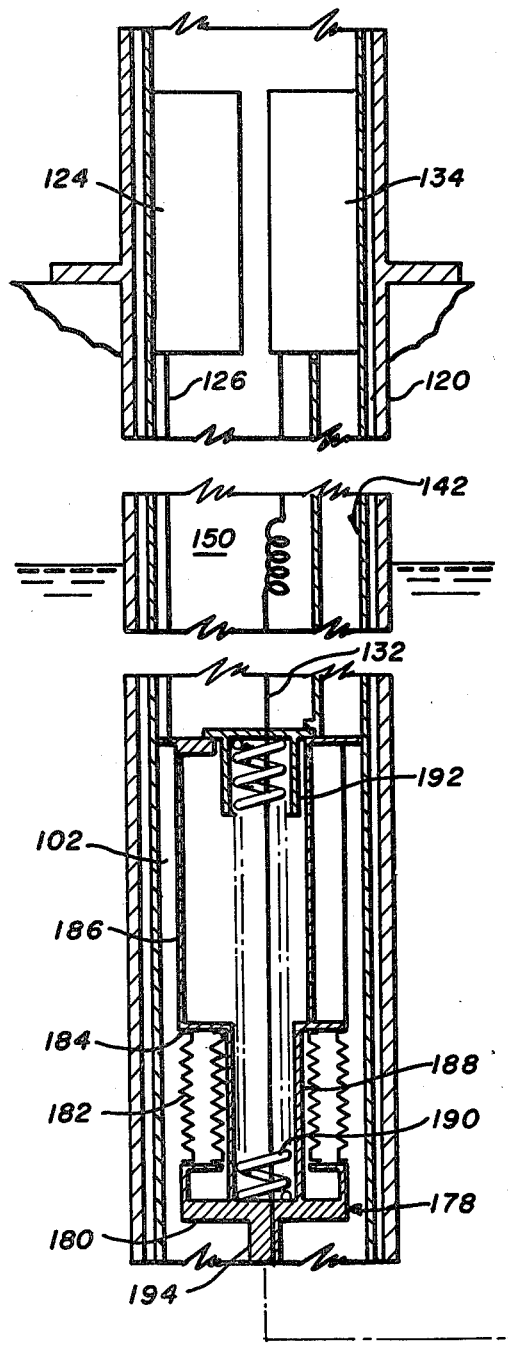
FIGS. 8a and 8b show the details of the actuator shown in FIG. 5 in conjunction with a pneumatically actuated release mechanism.
Figure 8B:
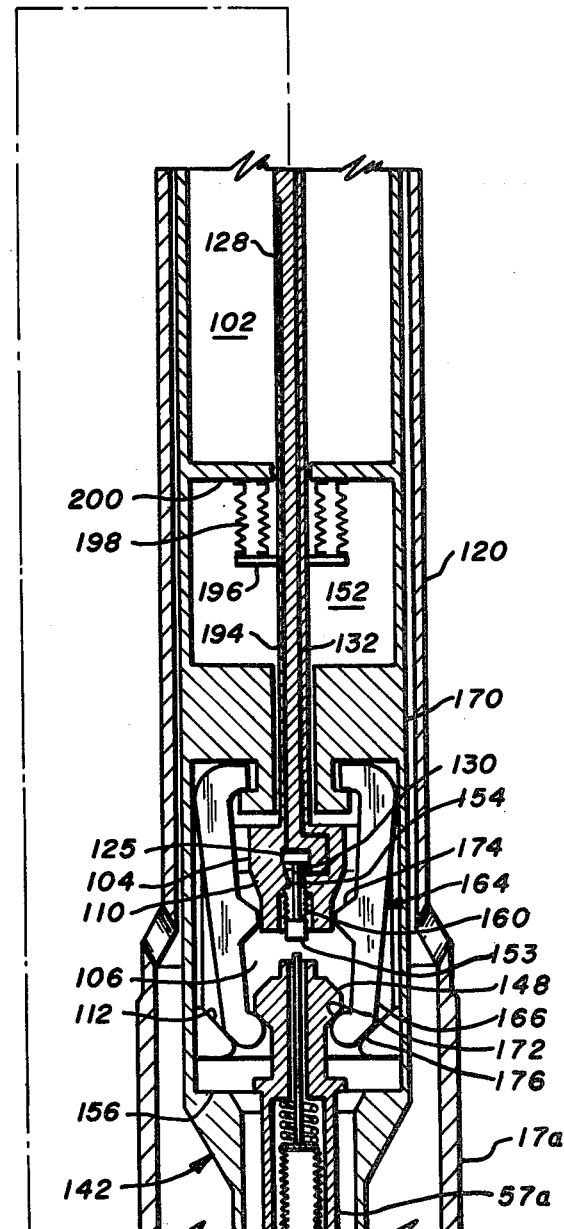

Referring now to FIGS. 8a and 8b, the drive housing 120 is attached to the upper end of the duct tube 17a and contains an extension tube 142 which is slidably disposed therein and which can be vertically moved by driving means (not shown) connected to the housing 120. The driving means is more fully described in the referenced patent. The support column 57a is connected to the extension tube 142 by a releasable gripper mechanism 164 located within the extension tube 142 immediately adjacent the knob 148 on the support column 57a.

The gripper mechanism 164 comprises a set of gripper jaws 166 which is mounted in a gripper jaw holding section 170 integrally formed with the extension tube 142. The mounting is accomplished such that the jaws 166 are capable of radially pivotable movement. Each of the gripper jaws 166 has a gripping surface 172 which selectively serves to grip the knob 148 of the support column 57a. Each of the jaws 166 additionally has unlatching cam surface 174 and a latching cam surface 176 which interact with a gripper release mechanism 178 to position the jaws 166 for selectively gripping or release of the support column 57a.

The gripper release mechanism 178 has a first piston surface 180 to which a first double bellows arrangement 182 is fixed. The bellows arrangement 182 connects to an end plate 184 of a tubular projection 186 which is integral with the extension tube 142 so as to provide a flexible seal between the first piston surface 180 and the extension tube 142. Above the first piston surface 180 and integral therewith is a tubular projection 188 which seats against the projection end plate 184 when the gripper mechanism 164 is in its retracted positive grip initiating position, the end plate 184 serving as an end stop for the gripper release mechanism 178. The projection 188 also serves as a seat for a gripper release spring 190 which is seated at its opposite end in a seat 192 formed in the extension tube 142. Extending beneath the piston surface 180 on the opposite side of the tubular projection 188 is a shaft 194 which has a second piston surface 196 located intermediate its length. A second double bellows 198 is sealingly connected between the second piston surface 196 and a lateral projection 200 from the extension tube 142. The first double bellows 182 and the second double bellows 198 thus serve to form a first pressure chamber 102.

The lower end of the shaft 194 is connected to a gripper jaw actuator 104. The actuator 104 has a hollow portion 106 into which the support column 57a extends. The actuator 104 has unlatching cam surfaces 110 formed thereon while the lower portion of the actuator 104 has latching cam surfaces 112 formed integral therewith.

In order to actuate the gripper release mechanism 178 a pneumatic pressure system is provided. A header assembly 124 (shown schematically and more fully described in the referenced patent) supplies pneumatic pressure to chamber 102 through a passage 126. An outlet tube 128 runs from chamber 102 down through the shaft 194 and terminates in a valve chamber 125 near the lower end of the shaft 194. A pneumatic dump control valve 130 separates the outlet tube 128 from the discharge tubing 132 which runs back up the shaft 194 and into pressure vent holdup cans 134 which are capable of storing substantially the complete volume of pneumatic fluid which would be in the first chamber 102 at its working pressure.

The gripper release mechanisms 178 is actuated to control the gripper mechanism 164 in the following manner. Pneumatic pressure at approximately 200 psi is supplied through the header assembly 124 to chamber 102. This pressure acts on the first piston surface 180 to move the tubular projection 188 against the bias of the gripper release spring 190 against the projection end plate 184. The chamber 148 above the first piston 80 is in fluid communication with the chamber 150 within the interior of the extension tube 142 which is at substantially atomspheric pressure. Pressure on the second piston surface 196 within a chamber 152 on the opposite side of the second bellows 198 from chamber 102 is that of the sodium coolant. The pressure of the liquid sodium is approximately 20 psi. With the piston 180 in the retracted position the gripper jaw actuator 104 will be moved upwardly such that the latching cam surfaces 112 will engage the latching cam surfaces 176 of the gripper jaws 166 to move the jaws radially inwardly to grip the knob 148 of the support column 57a.

The lower end of the shaft 194 has a recess in which is disposed a valve push rod 154 one end of which has a hard stop 153 located directly above the push rod 54a and the other end of which is connected to the control valve 130. The control valve 130 is seated in the lower portion of the chamber 125 and will normally be in the closed position due to the high pressure in chamber 102 acting on the upper side of the control valve 130 in chamber 125. The inside of the valve bellows 160 is in communication with the low pressure gas in discharge lines 132 and holdup cans 134.

As soon as the reactor coolant outlet temperature reaches a predetermined upper limit the push rods 54a and 154 will lift the control valve 130 and the pressure in the first chamber 102 will be released as the pneumatic fluid within the chamber 102 is transferred to the pressure vent holdup cans 134. As soon as the pressure within the chamber 102 is released, the residual pressure in chamber 102 acting on the underside of the first piston 180 and the pressure in chamber 152 on piston 196 will be overcome by the bias of the gripper release spring 190 and the first and second bellows seals 182, 198 to force the shaft 194 downwardly driving the gripper jaw actuator 104 against the shoulder 156 of the extension tube 142. As the gripper jaw actuator 104 moves downwardly, the unlatching cam surfaces 110 thereof will engage the unlatching cam surfaces 174 of the gripper jaws 166 to move the jaws radially outwardly so as to release their grip on the knob 148 of the support column 57a to cause a positive disengagement thereof. The poison bundle (comprising support column 57a, the arrangement of sensor fuel pins 26a, bulb 46a and bellows 52a contained therein, the knob 148, connector plate 19a, and safety rods 12a) will thus be free to fall under the influence of gravity, with additional impetus being provided by the scram assist spring 67a.

Two embodiments of the invention have thus been described, one in which the sensing and actuating structures remain fixed within the safety assembly during a SAS and PPS scram when the poison bundle is dropped into the core, and the other in which the sensing and release structures are part of the poison bundle and fall with it during a scram. It should be evident to one skilled in this art that a variety of release mechanisms other than the cam and pneumatically operated devices described in the above embodiments, can be actuated with the present invention. In addition, poison material other than B4C control rods can also be used with this invention. For example, the present invention can be used to actuate a release mechanism for dropping tantalum balls into the reactor core. While the above embodiments of the invention have been shown and described, it will be understood that they are merely illustrative and that changes may be made without departing from the scope of the invention as claimed.

What is claimed is:

1. An apparatus for inferring the core average outlet temperature in a liquid metal-cooled nuclear reactor and rapidly dropping poison material into the reactor core upon occurrence of a critical value of the temperature, comprising:
   a. said reactor core having a liquid metal coolant flow therethrough;
   b. a safety duct located in said reactor core and extending upward above said core;
   c. a vertical reactor coolant flow path through said duct;
   d. at least one fuel pin axially disposed in said safety duct and within said coolant flow path;
   e. temperature responsive actuating means located in said flow path above said fuel pins, said actuating means including a fixed mass of sensor fluid confined to expand or contract in response to the temperature of the coolant in the flow path above said fuel pins, whereby a linear motion is imparted to a portion of said actuating means;
   f. a poison bundled including neutron absorbing poison material movably located in said duct; and
   g. holding means operatively connected between said poison bundle and said actuating means for suspending said poison bundle above said core and for releasing said poison bundle upon a predetermined motion of said actuating means.

2. The apparatus of claim 1 further comprising a first inner column containing said flow path.

3. The apparatus of claim 2 wherein said first column is sized in relation to said fuel pins such that the ratio of coolant flow rate through said first column to the heat produced by said fuel pins is approximately equal to the ratio of the coolant flow rate through said reactor core to the heat produced in said reactor core.

4. The apparatus of claim 3 further comprising a second column surrounding said first column between the elevations of said fuel pins.

5. The apparatus of claim 4 further comprising insulating means between said first inner column and said second inner column when said poison bundle is in the withdrawn position.

6. The apparatus of claim 4 wherein said temperature responsive actuating means is contained within said first column.

7. The apparatus of claim 6 wherein said temperature responsive actuating means comprises:
   a. a sensor bulb, a sensor tube, and a chamber all in fluid communication and containing sensor fluid; and
   b. means, one end of which is located in said chamber, for translating the expansion of said fluid into a linear motion.

8. The apparatus of claim 7 wherein said means for translating the expansion of said fluid into a linear motion comprises:
   a. a metal bellows; and
   b. a push rod attached to said bellows.

9. The apparatus of claim 8 wherein said poison bundle is slidably disposed about said first column.

10. The apparatus of claim 9 wherein said poison bundle comprises:
    a. a plurality of safety rods;
    b. connector means for connecting said safety rods at their upper ends;
    c. a first set of latch arms attached to said connector means; and
    d. a support ring formed around the top of said first set of latch arms.

11. The apparatus of claim 10 wherein said holding means comprises:

a. a step cam attached to said push rod; and
b. one or more latches rotatably mounted to said first column, each of said latches having a first roller in contact with said cam and a second roller in contact with said support ring.

12. The apparatus of claim 11 wherein said cam is stepped at both ends.

13. The apparatus of claim 12 further comprising a bellows assist spring disposed along said push rod and interposed between said first column and said bellows.

14. The apparatus of claim 13 wherein said sensor fluid is NaK.

15. The apparatus of claim 14 further comprising a test inlet connected to the lower portion of said first column.

16. The apparatus of claim 15 further comprising:
a. a second set of latch arms attached to said connector means having notches at a higher elevation than said support ring; and
b. reset mechanism means slidably disposed inside the upper end of said safety duct having gripper arms at its lower end adapted to engage said notches.

17. The apparatus of claim 3 wherein said temperature responsive actuating means is contained within said first column.

18. The apparatus of claim 17 wheren said actuating means comprises:
a. a sensor bulb, a sensor tube, and a metal bellows, all in fluid communication and containing sensor fluid; and
b. a push rod attached to said bellows.

19. The apparatus of claim 18 wherein said first column is connected to said poison material.

20. The apparatus of claim 19 wherein said poison bundle comprises:
a. a plurality of safety rods; and
b. connector means for connecting said safety rods at their upper ends, said connector means being attached to said first inner column.

21. The apparatus of claim 20 wherein said holding means are pneumatically operated.

22. The apparatus of claim 21 wherein said holding means comprises:
a. a shaft located above said first column and supported from above said safety duct;
b. pneumatically operated gripper means between said shaft and said first inner column; and
c. valve means located in the lower end of said shaft adapted to operate said pneumatic gripper means, said valve means being located above and responsive to the motion of said push rod.

23. The apparatus of claim 22 further comprising:
a. a second column of larger cross-section than said first column, located below said first inner column, the lower end of said first column extending part way down into said second inner column when said poison bundle is in the withdrawn position; and
b. sealing means between said first inner column and said second inner column adapted to permit said first column to slide within said second column.

* * * * *